(12) United States Patent
Jurena et al.

(10) Patent No.: US 9,803,447 B2
(45) Date of Patent: *Oct. 31, 2017

(54) ASYMMETRICAL BUTTON FOR RAM-TYPE BLOWOUT PREVENTERS

(71) Applicant: Cameron International Corporation, Houston, TX (US)

(72) Inventors: Johnny E. Jurena, Cypress, TX (US); David J. McWhorter, Cypress, TX (US); Charles E. Gibbs, Stafford, TX (US); Steven F. Shimonek, League City, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,863

(22) Filed: Jun. 27, 2015

(65) Prior Publication Data
US 2016/0024870 A1    Jan. 28, 2016

Related U.S. Application Data

(63) Continuation of application No. 13/553,682, filed on Jul. 19, 2012, now Pat. No. 9,068,427.

(51) Int. Cl.
*E21B 33/06* (2006.01)
*F16K 51/00* (2006.01)

(52) U.S. Cl.
CPC ............ *E21B 33/062* (2013.01); *F16K 51/00* (2013.01); *Y10T 137/0491* (2015.04)

(58) Field of Classification Search
CPC ...... E21B 33/06; E21B 33/061; E21B 33/062; E21B 33/063; F16K 51/00
USPC .......... 251/1.1, 1.2, 1.3; 166/85.4, 363, 364
See application file for complete search history.

(56) References Cited

U.S. PATENT DOCUMENTS

| | | |
|---|---|---|
| 3,208,357 A | 9/1965 | Allen et al. |
| 3,272,222 A | 9/1966 | Allen |
| 3,647,174 A | 3/1972 | LeRouax |
| 3,670,761 A | 6/1972 | Lerouax |
| 3,744,749 A | 7/1973 | Le Rouax |
| 3,791,616 A | 2/1974 | Le Rouax |
| 4,214,605 A | 7/1980 | Hardgrave |
| 4,437,643 A | 3/1984 | Brakhage, Jr. et al. |
| 4,488,703 A | 12/1984 | Jones |
| 4,601,232 A | 7/1986 | Troxell, Jr. |
| 4,877,217 A | 10/1989 | Peil et al. |
| 4,964,610 A | 10/1990 | Wong et al. |
| 4,969,390 A | 11/1990 | Williams, III |
| 4,976,402 A | 12/1990 | Davis |

(Continued)

OTHER PUBLICATIONS

"Product Service Bulletin: PSBL-All 15K ES BOP Piston Rod," Jun. 28, 2011, Texas Oil Tools, Conroe, TX.

*Primary Examiner* — Craig Schneider
*Assistant Examiner* — Andrew J Rost
(74) *Attorney, Agent, or Firm* — Eubanks PLLC

(57) ABSTRACT

An asymmetrical ram button is provided. In one embodiment, a system includes a blowout preventer including such a button. Particularly, the blowout preventer may include an actuation assembly having the asymmetric ram button attached to a connecting rod coupled to a piston. The asymmetric body of the button can engage an internal shoulder of the ram such that a retraction force on the actuation assembly causes the asymmetrical ram button to load against the internal shoulder. Additional systems, devices, and methods are also disclosed.

17 Claims, 8 Drawing Sheets

(56) References Cited

U.S. PATENT DOCUMENTS

| | | |
|---|---|---|
| 6,719,262 B2 | 4/2004 | Whitby et al. |
| 6,845,958 B2 | 1/2005 | Wood et al. |
| 8,166,993 B2 | 5/2012 | Childers |
| 9,068,427 B2 | 6/2015 | Jurena et al. |

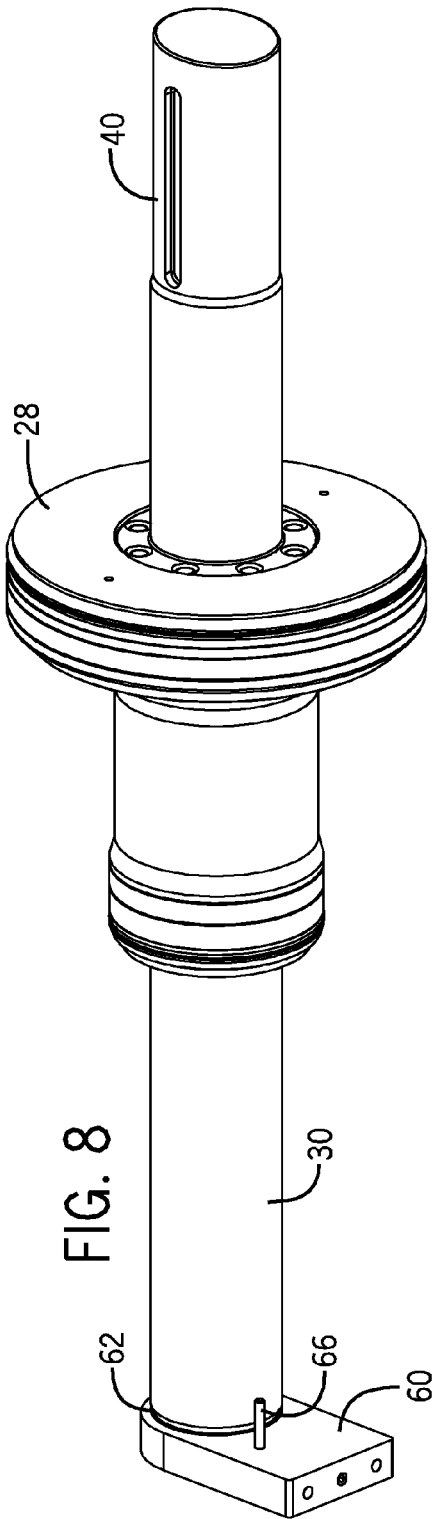
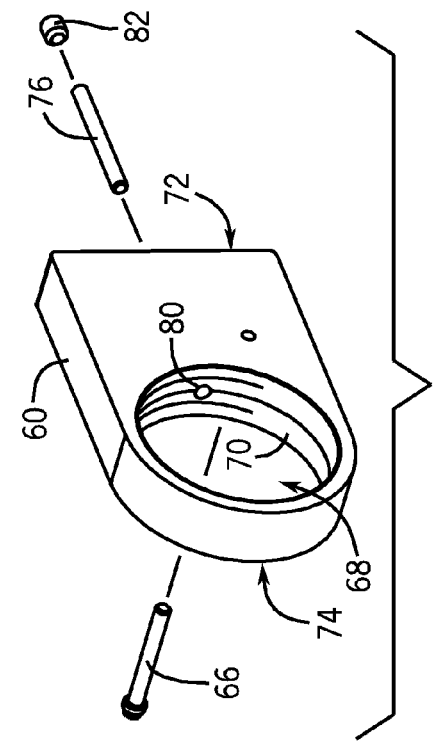
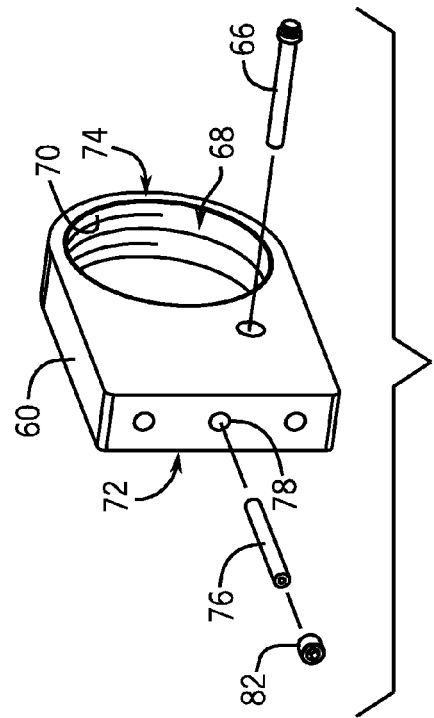

ASYMMETRICAL BUTTON FOR RAM-TYPE BLOWOUT PREVENTERS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

More particularly, wellhead assemblies often include a blowout preventer, such as a ram-type blowout preventer that uses one or more pairs of opposing rams that press against one another to restrict flow of fluid through the blowout preventer. The rams typically include main bodies (or ram blocks) that receive sealing elements that press together when a pair of opposing rams close against one another. Often, the rams are driven into and out of a main bore of a blowout preventer by operating pistons coupled to the rams by connecting rods. In a common design, a ram block includes a slot for receiving a ram button formed on the end of a connecting rod, which allows the operating piston and connecting rod (or some other actuator) to push and pull the ram block within the blowout preventer. But excessive loads on the ram button—such as from high wellbore pressure when the ram is in a closed, sealing position—can damage the ram button or the mating slot in the ram block.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to an asymmetrical ram button for coupling a connecting rod to a ram. In one embodiment, the asymmetrical ram button is inserted in a slot in a ram of a blowout preventer and a retraction force on the asymmetrical ram button causes it to load against a shoulder of the ram inside the slot. But in contrast to traditional, circular ram buttons that engage only a small portion of a ram slot shoulder, the presently disclosed asymmetrical ram button is shaped to engage a larger portion of the ram slot shoulder. This provides an increased surface area of engagement between the ram button and the shoulder, reducing the unit stress on these components as well as reducing the likelihood of damage from such stress. In some embodiments, the asymmetrical ram button is a separate component that is attached to a connecting rod (e.g., the button may be threaded onto an end of the connecting rod), although the asymmetrical ram button could instead be integrally formed with the connecting rod.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 8 illustrates a ram actuation assembly, including the connecting rod and the operating piston, removed from the bonnet and the housings of the bonnet and locking assemblies of FIG. 7;

FIGS. 9 and 10 depict the asymmetrical ram button of FIGS. 7 and 8 in accordance with one embodiment;

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
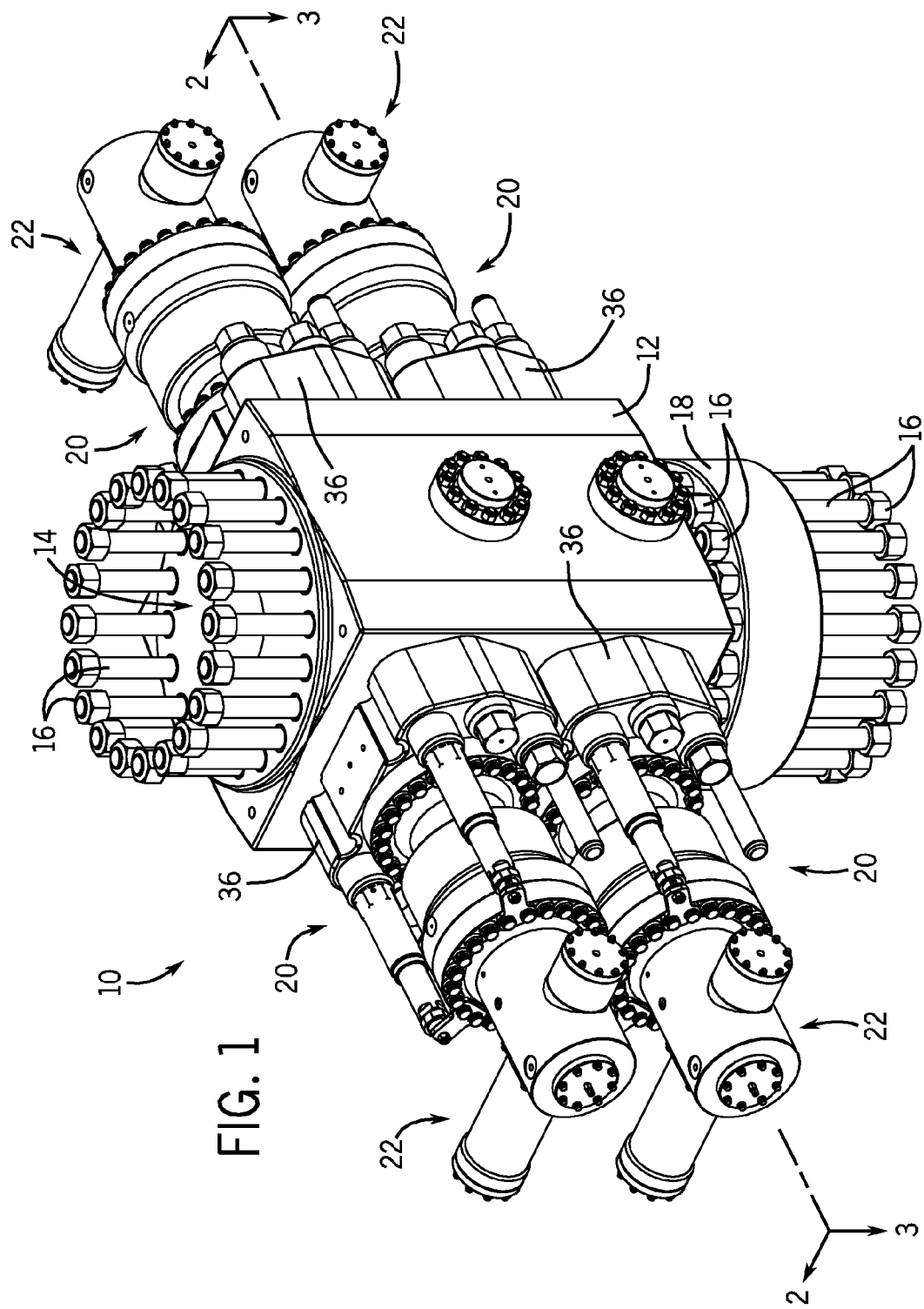
FIG. 1 is a perspective view of a blowout preventer having rams that may be extended into a bore of the blowout preventer to restrict flow through the bore in accordance with an embodiment of the present disclosure.

Turning now to the drawings, a blowout preventer 10 is illustrated in FIG. 1 by way of example. The depicted blowout preventer 10 includes a hollow main body 12 and a bore 14 that enables passage of fluid or tubular members through the blowout preventer 10. As will be appreciated, the blowout preventer 10 may be coupled to other equipment that facilitates natural resource production. For instance, production equipment or other components may be attached to the top of the blowout preventer 10 via fasteners 16 (provided in the form of studs and nuts in FIG. 1) and the blowout preventer 10 may be attached to a wellhead or spool via flange 18 and additional fasteners.

Figure 2:
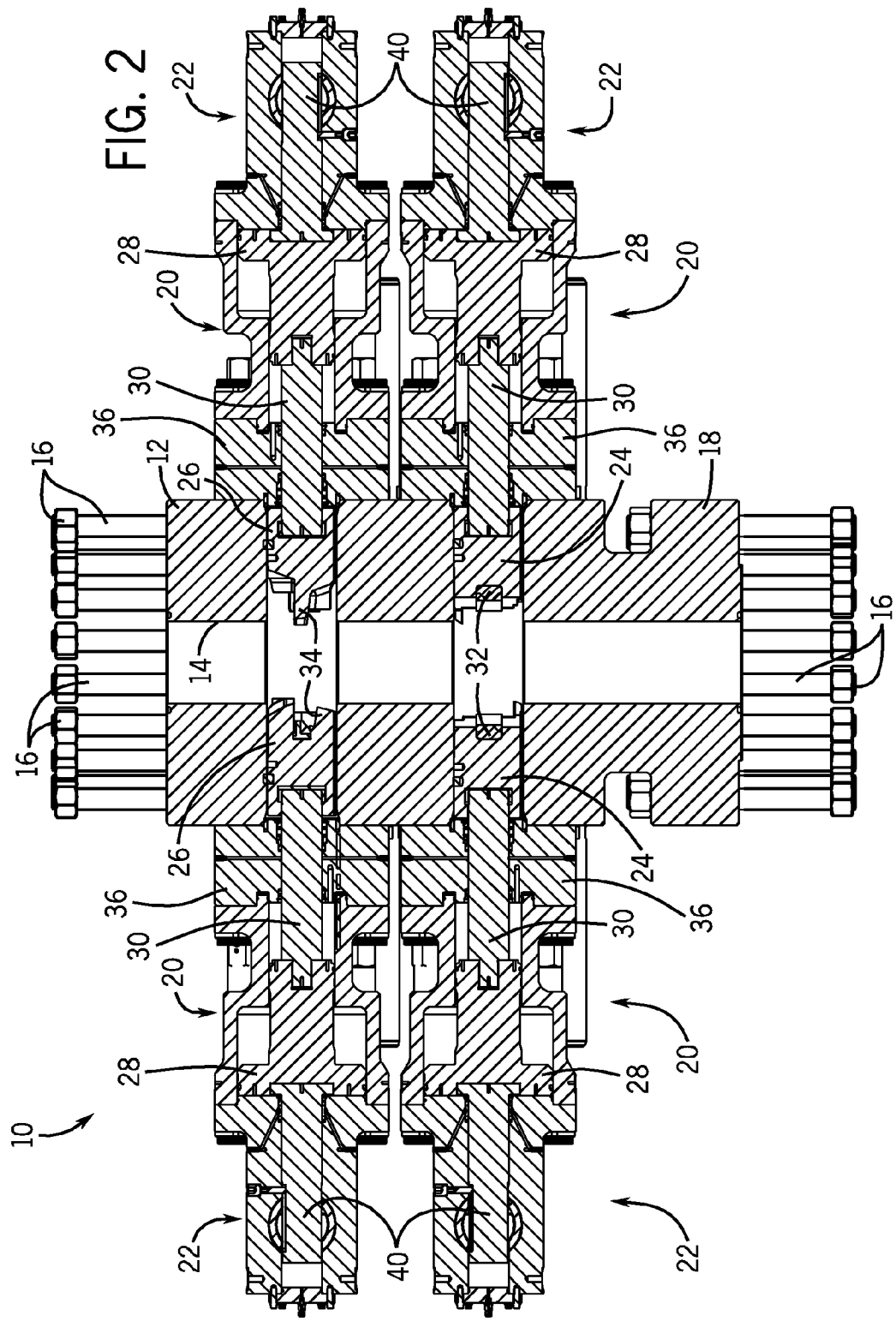
FIG. 2 is a vertical cross-section of the blowout preventer of FIG. 1, depicting operating piston assemblies coupled to rams in accordance with one embodiment.
Figure 3:
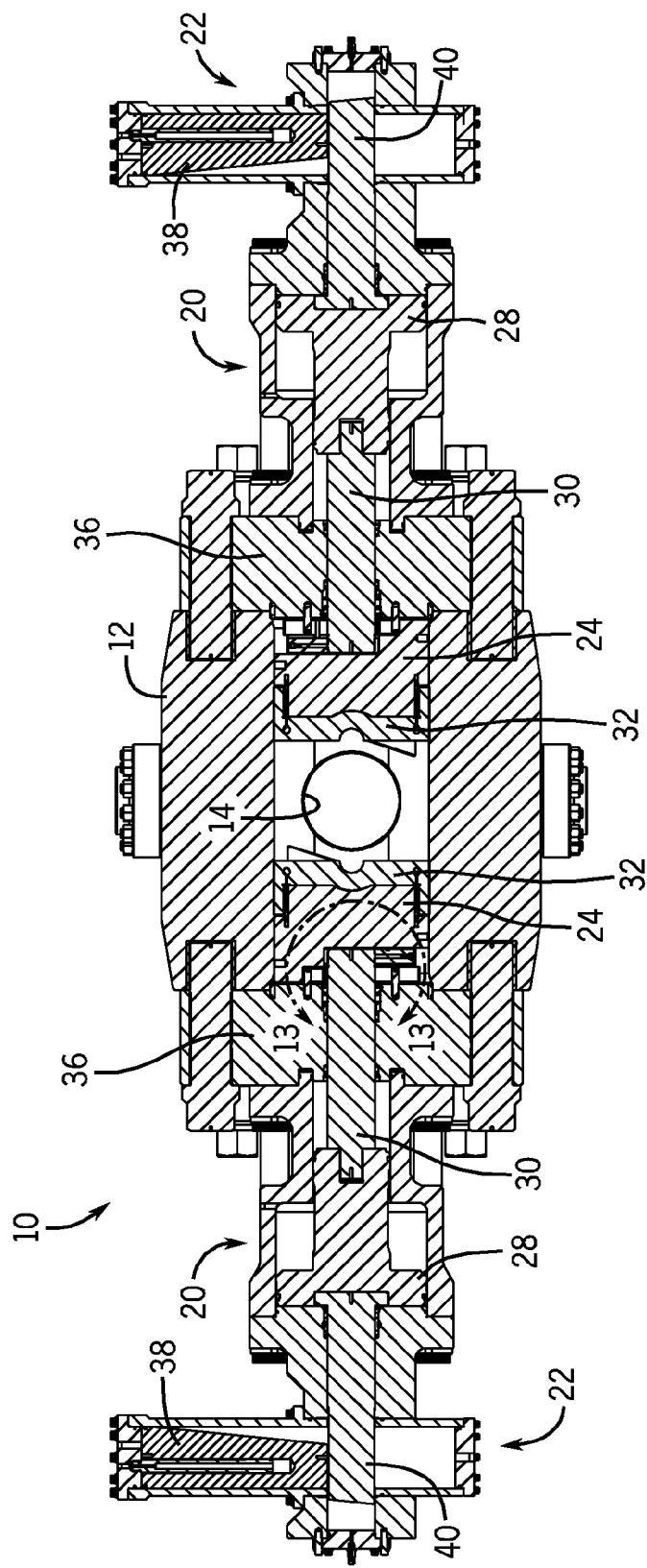
FIG. 3 is a horizontal cross-section of the blowout preventer of FIG. 1 also depicting operating piston assemblies coupled to rams and wedge lock mechanisms that may be engaged to hold the rams in a closed position.
Figure 13:
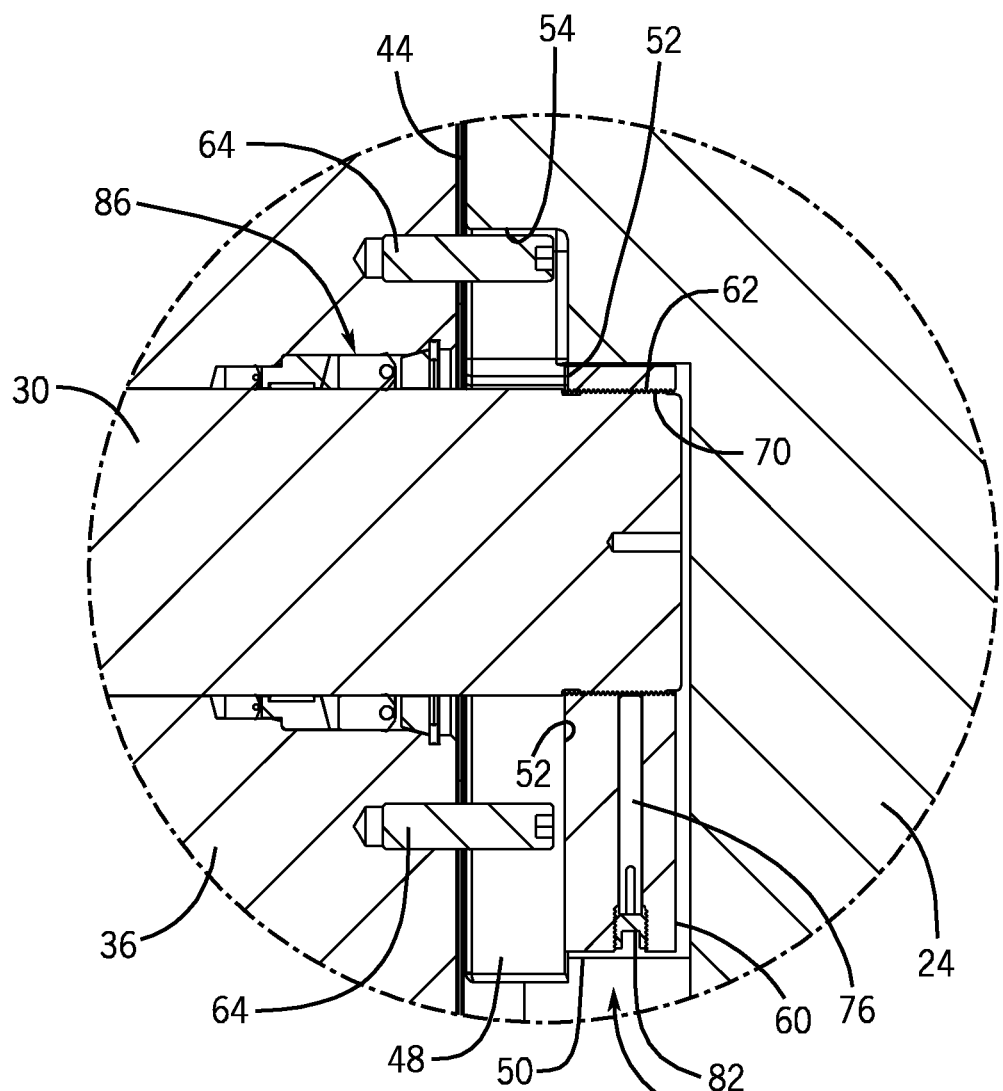
FIG. 13 is a detailed cross-section of a portion of the blowout preventer generally indicated by line 13-13 in FIG. 3, which depicts the ram, connecting rod, and asymmetrical ram button installed in the blowout preventer in accordance one embodiment.

Bonnet assemblies 20 secured to the main body 12 include various components that facilitate control of sealing rams disposed in the blowout preventer 10, and locking assemblies 22 enable the sealing rams to be locked in a closed position. Particularly, as illustrated in the cross-sections of FIGS. 2 and 3, the blowout preventer 10 includes rams 24 and 26 actuated by operating piston assemblies that include pistons 28 and connecting rods 30. In operation, a force (e.g., from hydraulic pressure) may be applied to the operating pistons 28 to drive the rams 24 and 26, via the connecting rods 30, into the bore 14 of the blowout preventer 10. The connecting rods 30 extend through bonnets 36 of the bonnet assemblies 20 and enable forces on the pistons 28 to be transmitted to the rams 24 and 26. Various seals may be provided between the connecting rods 30 and the bonnets 36 to inhibit leaking while enabling axial movement of the connecting rods through the bonnets; seal assembly 86 in FIG. 13 is one example of such seals. And although the rams 24 and 26 are hydraulically actuated in the presently depicted embodiment, it is noted that the rams 24 and 26 could be actuated in any other suitable manner as well.

In the presently depicted embodiment, the rams 24 are provided as pipe rams and the rams 26 are provided as shear rams. The pipe rams 24 have sealing elements 32 (also known as ram packers) that cooperate with one another when driven together to seal about a tubular member (e.g., a pipe) and inhibit flow through the bore 14 of the blowout preventer 10. The rams 26 have complementary shearing surfaces 34 for cutting through objects in the bore 14 (e.g., the tubular member or a wire) and sealing the bore. But the rams 24 or 26 could take other forms, such as blind rams. When the rams 24 and 26 are moved into the closed position to seal the bore 14, wedge locks 38 (FIG. 3) of the locking assemblies 22 may be moved into position behind tail rods 40 of the pistons 28 to hold the rams 24 and 26 in their closed positions. This allows the hydraulic pressures acting on the pistons 28 to be reduced (from the closing pressures) while still maintaining the rams 24 and 26 in the closed positions.

Figure 4:
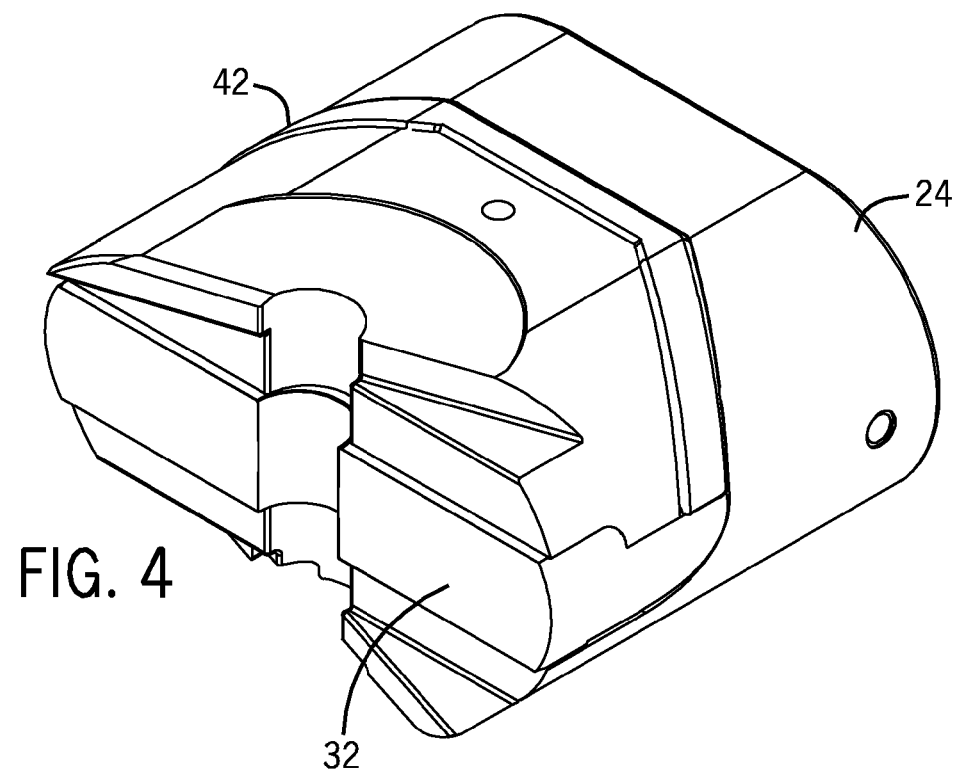
FIGS. 4-6 depict a ram of the blowout preventer of FIG. 1 in accordance with one embodiment.
Figure 5:
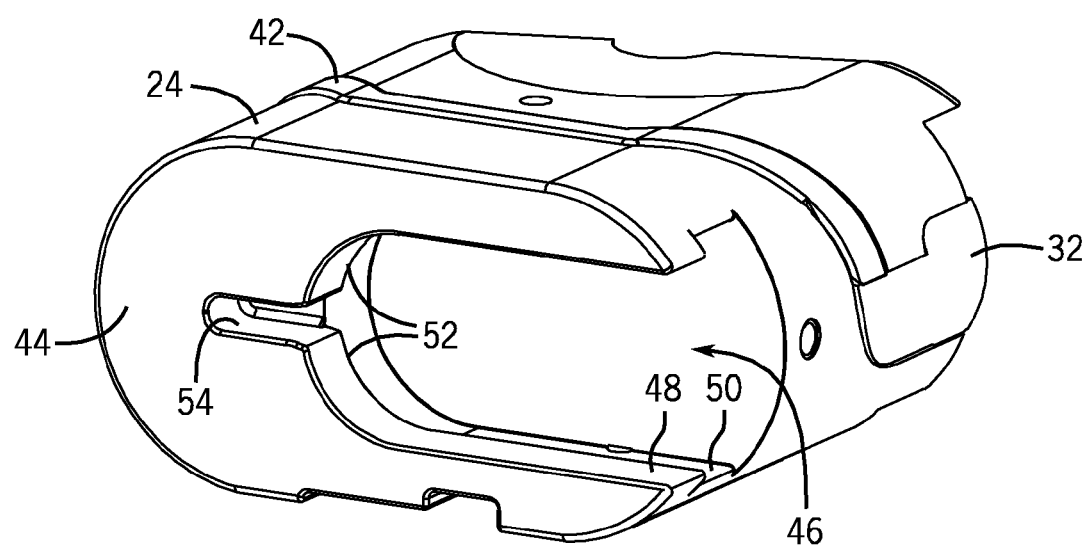
Figure 6:
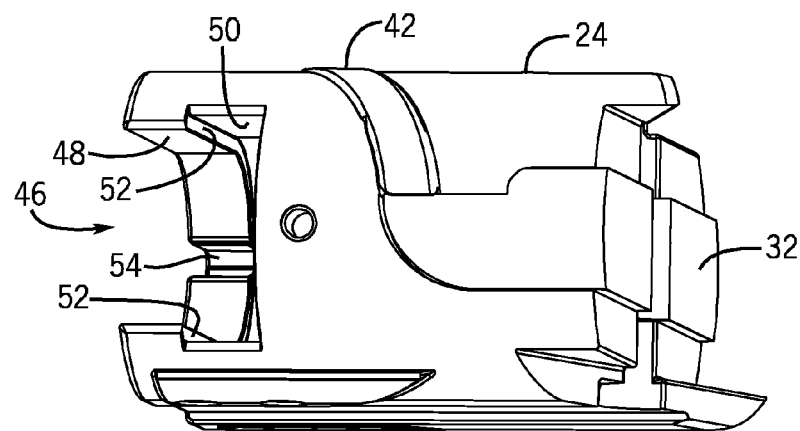

A more detailed example of a ram 24 in the form of a pipe ram is illustrated in FIGS. 4-6 and described further below. But it is first noted that rams 24 (as well as the rams 26) may be of any desired size and may vary depending on the intended application. For example, different pipe rams 24 may be sized for use with blowout preventers having various bore diameters and the ram packers 32 may be selected according to the diameter of the pipe about which the ram packers 32 are intended to seal. In other embodiments, the rams 24 include variable-bore pipe rams that may be used to seal around pipes having a range of diameters (e.g., 2⅞ to 4 inches, 2⅞ to 5 inches, or 3½ to 5⅞ inches). And although rams 24 and 26 are depicted herein as pipe rams and shear rams, still other embodiments could include different rams (e.g., blind rams).

Again with reference to FIGS. 4-6, the depicted ram 24 includes a top seal 42 in addition to the ram packer 32. The top seal 42 abuts the surface of the main body 12 above the ram 24 in FIG. 2 and, with the ram packer 32, seals upper and lower portions of the bore 14 from one another. The ram packer 32 and top seal 42 are formed of any suitable material, such as an elastomer. The ram 24 may include latching features to mate with corresponding features of an opposing ram, such as the angled features of the ram above and below the front face of the ram packer 32 in FIG. 4.

As depicted in FIGS. 5 and 6, the end face 44 of the ram 24 includes a slot 46 for receiving a connecting rod 30. The slot 46 extends along the major axis of the end face 44 from an edge of the ram 24 (e.g., extending horizontally from the right side as shown in FIG. 5), but other slot configurations may instead be used in other embodiments. The slot 46 has a stepped profile with inner walls 48 and 50. The slot is wider (measured parallel to the minor axis of the end face 44) between opposing sides of the wall 50 than between opposing sides of the wall 48, which defines a shoulder 52 in the slot 46. As discussed in greater detail below, the shoulder 52 is configured to engage a ram button that is integral with or attached to the connecting rod 30. An additional slot 54 may be provided in the wall 48 to enable receipt of an alignment pin 64 (FIG. 7) of the bonnet assembly 20.

Figure 7:
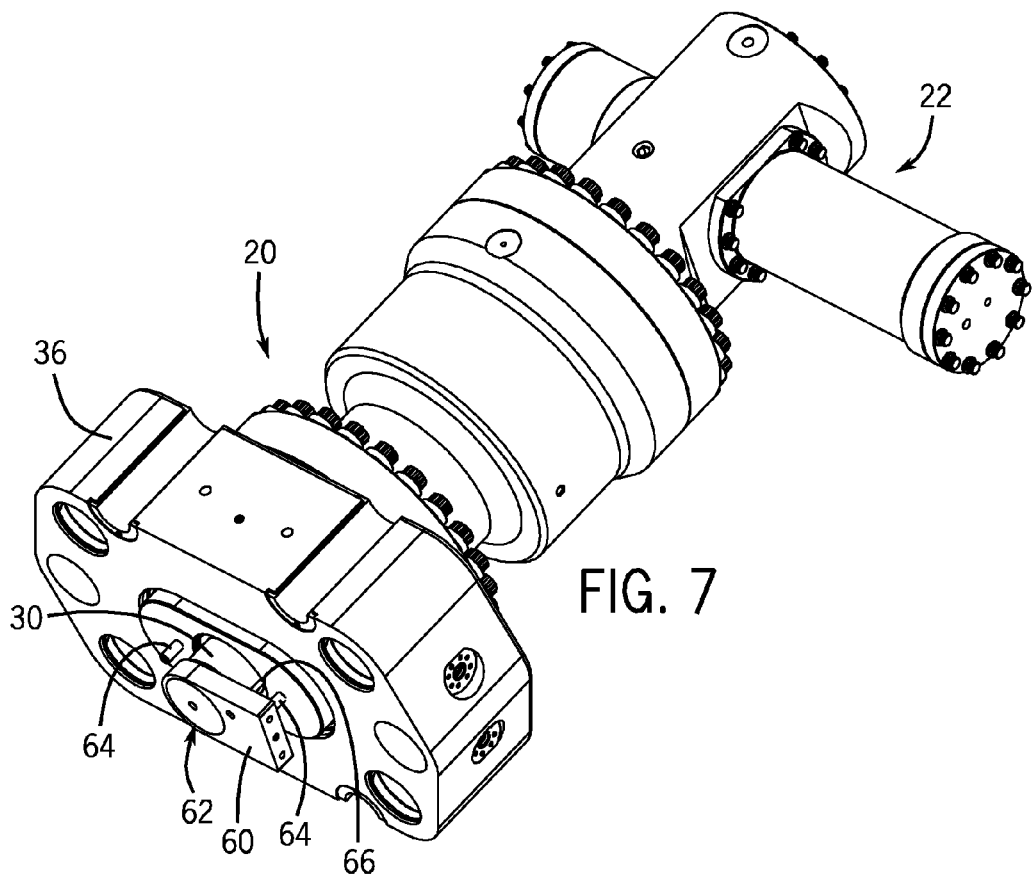
FIG. 7 is a perspective view of a bonnet assembly and a locking assembly of the blowout preventer of FIG. 1, and also depicts an asymmetrical ram button coupled to a connecting rod in accordance with one embodiment.
Figure 11:
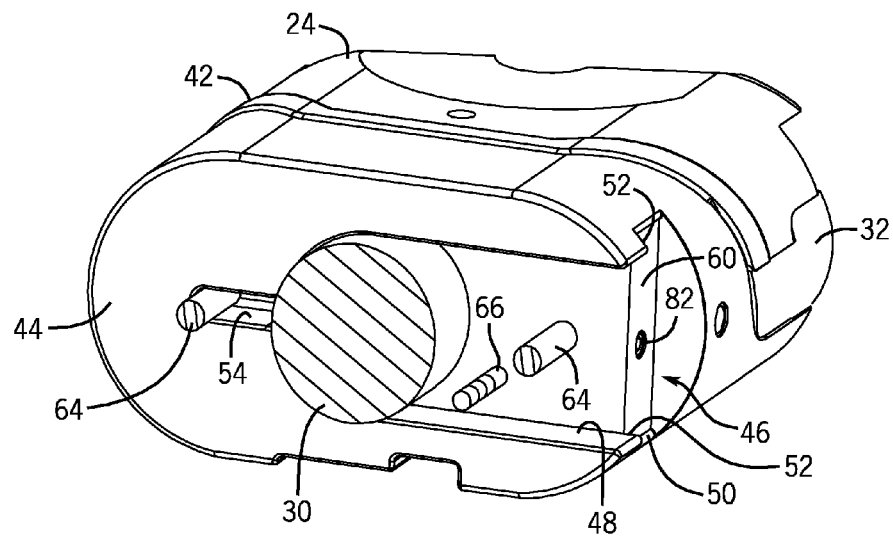
FIG. 11 is a rear perspective view of the ram of FIGS. 4-6 receiving the asymmetrical ram button coupled to the connecting rod in accordance with one embodiment.
Figure 12:
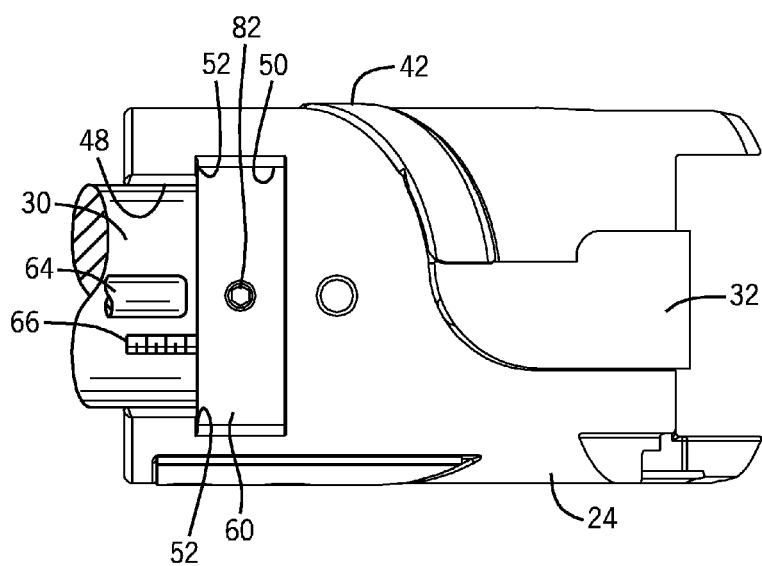
FIG. 12 is a side elevational view of the ram and the asymmetrical ram button of FIG. 11.

An example of the bonnet assembly 20 is depicted in FIG. 7 as removed from the main body 12 of the blowout preventer 10, while an example of the actuation assembly (including a ram button 60, the connecting rod 30, and the operating piston 28) of the bonnet assembly 20 is depicted in FIG. 8 as removed from the bonnet assembly 20. In some embodiments, such as that depicted in FIGS. 7 and 8, the ram button is an asymmetric ram button 60 that may be aligned with and then attached to a threaded end 62 of the otherwise button-less connecting rod 30. The asymmetric ram button 60 may be received in the slot 46 of a ram (such as depicted in FIGS. 11-13) to couple the connecting rod 30 to the ram.

The bonnet assembly 20 includes alignment pins 64 to facilitate alignment of the ram with the bonnet assembly 20 during installation. Either of the alignment pins 64 (depending on the orientation of the button 60 and the ram) may be received in the additional slot 54 in the ram, as discussed above. The button 60 may also include a positioning screw 66, such as a threaded cap screw, that facilitates axial alignment of the button 60 as it is threaded onto the threaded end 62 of the connecting rod 30. This maintains space between the button 60 and the bonnet 36 sufficient to receive wall 48 of the ram 24 and aids in installation of the ram 24 on the button 60.

The asymmetric ram button 60, as best shown in FIGS. 9 and 10, includes an aperture 68 for receiving the threaded end 62 of the connecting rod 30. Particularly, the aperture 68 includes a threaded surface 70 that engages the threaded end 62 such that the connecting rod 30 loads against the asymmetric ram button 60 via the mating engagement of the respective threads when the button 60 is threaded onto the connecting rod 30. Further, compared to traditional ram buttons, the asymmetric nature of the ram button 60 enables the loading of the ram button 60 against the shoulder 52 of the ram to be distributed over a greater surface area of the shoulder 52. And this reduces unit stress on both the edge of the button 60 and the shoulder 52, consequently reducing the likelihood of damage to these components during operation.

In the presently depicted embodiment, the asymmetric ram button 60 is a generally rectangular button having a rectangular (or tab) end 72 and a curved end 74 (e.g., an elliptical or circular end). In this embodiment, the ram button 60 has a profile similar in shape to that of the slot 46 in the ram 24. This configuration allows the button 60 to load against the majority of both the curved and straight portions of the generally horseshoe-shaped shoulder 52 in the ram 24. But in other embodiments, the ram button 60 may take other forms, particularly if the slot 46 is also provided in another form (e.g., the ram button 60 may be shaped to generally complement the shape of the slot 46). Additionally, asymmetric ram buttons 60 of other embodiments may be coupled to connecting rods 30 in different ways besides threaded engagement. For instance, the asymmetric ram buttons 60 may be separate buttons that are attached to the connecting rods without threads or the buttons could be formed integrally with the connecting rods.

Once installed on the threaded end 62 of the connecting rod 30, the ram button 60 may be secured with a locking pin 76. More specifically, as shown in FIGS. 9 and 10, the locking pin 76 may be inserted through an aperture 78 at an outer edge of the button 60 such that an end of the locking pin extends out of an aperture 80 in the threaded surface 70 to engage the threaded end 62 of the connecting rod 30 and inhibit rotation of the button 60 along the threaded end 62. And in some embodiments, such as that presently depicted, the aperture 78 is threaded to receive a threaded set screw 82 that retains the locking pin 76 within the button 60 and maintains engagement of the locking pin 76 against the connecting rod 30.

Additional details of the cooperation of the ram button 60 with the connecting rod 30 and a ram 24 may be better understood with reference to FIGS. 11-13. In this example, FIGS. 11 and 12 depict the ram button 60 installed on the connecting rod 30 and inserted into the slot 46 of the ram 24, while FIG. 13 is a detailed cross-section of the ram 24, the connecting rod 30, and the ram button 60 installed in the blowout preventer 10. It is further noted that, for the sake of clarity, in FIGS. 11 and 12 portions of the connecting rod 30 and the alignment pins 64 are sectioned away to better show how the ram 24 is received on the connecting rod 30, the ram button 60, and the alignment pins 64.

As noted above with respect to FIGS. 2 and 3, the connecting rod 30 (e.g., under the influence of the operating piston 28) may control the position of the ram 24 to facilitate the control of flow through the blowout preventer 10. A retraction force on the connecting rod 30—which may result, for example, from opening pressure on the operating piston 28 or from fluid pressure within the slot 46 that acts on the button 60 or the end face of the connecting rod 30—causes the ram button 60 to load against the shoulder 52 in the slot 46. In some prior arrangements, connecting rods have integral, circular ram buttons that load against shoulders of ram slots in response to such retraction forces. But in those designs, due to the discontinuity of the circular ram buttons and generally rectangular ram slots, the circular ram buttons only fill a small portion of the ram slots and engage correspondingly small portions of the shoulders of the ram slots in response to retraction forces. This increases the stress on both the circular ram buttons and the mating surfaces of the slots and increases the risk of damage to these components.

In contrast, the asymmetric ram button 60, as depicted in FIGS. 11-13, fills a greater portion of the ram slot 46 than would be the case with a circular ram button. Moreover, the ram button 60 engages not only the curved portion of the shoulder 52 (located inside the slot 46 just to the left of the connecting rod 30 in FIG. 11), but also engages a much greater area of the straight portions of the shoulder 52 (generally parallel to the major axis of the end face 44) compared to that which would be engaged by a traditional, circular ram button. This distributes the loading of the ram button 60 over a greater area of engagement with the shoulder 52, reducing stress and the risk of damage to these components and accommodating operation of the rams and the blowout preventer at higher pressures. For example, while the asymmetric button 60 may be used in blowout preventers of any rated pressure, such an arrangement may find particular use in blowout preventers with high pressure ratings, such as 20,000 psi, 25,000 psi, 30,000 psi, or even greater.

In some embodiments, the asymmetric ram button engages a majority of the shoulder 52. It will be appreciated that the unit stress on the shoulder 52 and the mating surfaces of the ram button 60 is inversely proportional to the surface area over which these components engage. Accordingly, in some embodiments, like that of FIGS. 11-13, the ram button 60 loads against almost the entire shoulder 52 (i.e., against more than ninety percent of the surface area of the shoulder 52). But in other embodiments, the asymmetric ram button 60 may engage a smaller portion of the surface area of the shoulder 52, such as seventy-five percent, fifty percent, or even less, while still providing stress-reducing advantages over the traditional, circular ram buttons.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
   a blowout preventer;
   a ram disposed in the blowout preventer, the ram including an end face having a major axis, a minor axis, and a slot that extends along the major axis of the end face from an edge of the ram; and
   an actuation assembly coupled to the ram to enable movement of the ram within the blowout preventer, the actuation assembly including a button disposed in the slot in the ram, a connecting rod attached to the button, and a piston coupled to the connecting rod, the button having an asymmetric body to engage an internal shoulder of the ram within the slot such that, during operation, a retraction force on the actuation assembly causes the asymmetric body of the button to load against the internal shoulder of the ram, wherein an end of the connecting rod is received within the slot with the button and the asymmetric body of the button extends lengthwise within the slot from the connecting rod toward the edge of the ram.

2. The system of claim 1, wherein the asymmetric body includes a rectangular end and an elliptical end opposite the rectangular end.

3. The system of claim 1, wherein the asymmetric body of the button is threaded onto the connecting rod.

4. The system of claim 1, wherein the actuation assembly comprises a locking pin in the button that engages threads of the connecting rod.

5. The system of claim 1, wherein the button and the slot are configured such that, during operation, a load on the button from a retraction force on the actuation assembly is distributed by the asymmetric body across a greater area on the internal shoulder of the ram than an area on the internal shoulder over which the load would be distributed if the button were a circular button.

6. The system of claim 1, wherein the ram is a pipe ram.

7. The system of claim 1, comprising a bonnet assembly in which the piston is disposed.

8. The system of claim 7, wherein the bonnet assembly includes two alignment pins on opposite sides of the connecting rod, and wherein one of the two alignment pins is positioned within an additional slot in the ram.

9. The system of claim 7, comprising a locking assembly coupled to the bonnet assembly.

10. The system of claim 9, wherein the locking assembly includes a wedge lock that enables the ram to be maintained in a closed position in the blowout preventer regardless of the level of hydraulic pressure on the piston.

11. A system comprising:
a connecting rod; and
an asymmetrical ram button coupled to the connecting rod and configured to be received in a slot of a ram of a blowout preventer, the asymmetrical button having an elongate body that is coupled to the connecting rod and is elongate in a direction transverse to the connecting rod, wherein the asymmetrical ram button includes a curved end configured to engage a curved portion of an internal shoulder of the slot of the ram and a tab end configured to engage a majority of the surface area of portions of the internal shoulder extending from the curved portion to an exterior of the ram.

12. The system of claim 11, wherein the asymmetrical ram button is not integrally formed with the connecting rod.

13. The system of claim 11, wherein the asymmetrical ram button includes a threaded aperture to enable attachment of the asymmetrical ram button to a threaded portion of the connecting rod.

14. The system of claim 13, comprising a locking pin in the asymmetrical ram button that engages the threaded portion of the connecting rod to inhibit rotation of the asymmetrical ram button about the connecting rod.

15. The system of claim 11, comprising the ram.

16. The system of claim 15, comprising a blowout preventer including the ram, the asymmetrical ram button, and the connecting rod.

17. The system of claim 11, wherein the asymmetrical ram button includes an aperture along the length of the elongate body closer to a first end of the asymmetrical ram button than to a second end of the asymmetrical ram button opposite the first end.

* * * * *